US005226522A

United States Patent [19]

Johnson et al.

[11] Patent Number: 5,226,522

[45] Date of Patent: Jul. 13, 1993

[54] MOVING HANDRAIL GUIDE MOUNT WITH VIBRATION ISOLATION

[75] Inventors: Gerald E. Johnson, Farmington; Mukunda B. Pramanik, Burlington; Ary O. Mello, Newington, all of Conn.

[73] Assignee: Otis Elevator Company, Farmington, Conn.

[21] Appl. No.: 915,159

[22] Filed: Jul. 16, 1992

[51] Int. Cl.[5] .............................................. B65G 15/00

[52] U.S. Cl. .................................... 198/335; 198/337

[58] Field of Search ................................ 198/335, 337

[56] References Cited

U.S. PATENT DOCUMENTS

| | | | |
|---|---|---|---|
| 3,981,118 | 9/1976 | Johnson et al. | 198/335 X |
| 3,989,133 | 11/1976 | Courson et al. | 198/335 |
| 4,762,217 | 8/1988 | Steacy | 198/337 |
| 4,836,353 | 6/1989 | Adrian et al. | 198/335 |
| 4,871,056 | 10/1989 | Saito | 198/335 |
| 4,932,512 | 6/1990 | Rivera | 198/335 X |
| 4,934,506 | 6/1990 | Rivera | 198/335 |
| 4,946,020 | 8/1990 | Rivera et al. | 198/335 |

FOREIGN PATENT DOCUMENTS

| | | | |
|---|---|---|---|
| 0119580 | 10/1978 | Japan | 198/335 |
| 0261194 | 10/1989 | Japan | 198/337 |
| 0317983 | 12/1989 | Japan | 198/337 |
| 0023191 | 1/1990 | Japan | 198/337 |

*Primary Examiner*—Robert P. Olszewski
*Assistant Examiner*—James R. Bidwell
*Attorney, Agent, or Firm*—William W. Jones; Richard D. Getz

[57] ABSTRACT

The guide rail for a moving handrail on an escalator or moving walkway is mounted on a glass balustrade by a mount assembly which includes a vibration-isolating gasket between the balustrade and the guide rail. The gasket is preferably formed from a closed cell foam material which isolates vibrations so that vibrations of the guide rail and handrail engendered by operation of the handrail do not cause the glass balustrade to vibrate. Controlling vibration of the glass balustrade quiets the escalator since the glass, if allowed to vibrate, will act as a loudspeaker which magnifies and broadcasts escalator handrail noise.

3 Claims, 1 Drawing Sheet

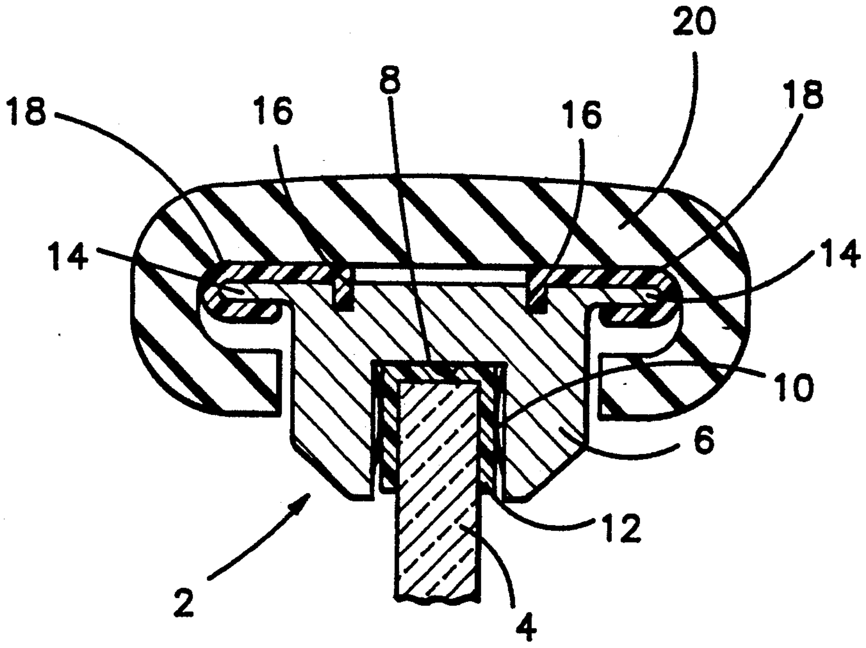
20
8
18
16
16
18
14
14
10
6
12
2
4

MOVING HANDRAIL GUIDE MOUNT WITH VIBRATION ISOLATION

TECHNICAL FIELD

This invention relates to an escalator or moving walkway having reduced handrail noise. More particularly, this invention relates to an assembly for minimizing handrail-induced vibration of a glass balustrade on the escalator or walkway.

BACKGROUND ART

Modern escalators and moving walkways are designed and constructed with aesthetics as a major consideration. The desire is to achieve a streamlined and clean appearance, and to do away with the bulky, heavy components of the past. To this end, slender balustrades are preferred along with sleek handrails and decks. One of the most popular balustrade materials preferred for use with these modern transporters is glass. Glass is relatively easy to work with, structurally sound and architecturally attractive. Glass balustrades have narrow metal handrail guide rails mounted on them to guide and control movement of the handrails during operation of the transporter. The guide rails are spring clipped, bolted, or adhesively secured to the glass so as to be firmly held in place. A hard paper gasket is frequently used between the guide rail and the edges of the balustrade to increase friction between the guide rail and balustrade, and to protect the glass from chipping or cracking. A plastic strip or strips of low friction plastic is often mounted on the guide rail to form the contact surfaces for engagement by the handrail. The newels of the balustrade are generally provided with pin bearings over which the handrail moves as it enters and exits its passenger-transporting path of travel. U.S. Pat. Nos. 4,836,353 granted Jun. 6, 1989 to W. Adrian, et al.; 4,946,020 granted Aug. 7, 1990 to J. A. Rivera, et al.; and 4,982,829 granted Jan. 8, 1991 to G. E. Johnson, et al., disclose variations of the balustrade and handrail system described generally above.

While the above-noted balustrade-handrail systems are aesthetically pleasing, it will be appreciated that the internal components, such as the guide rail, are not particularly well shielded from the ambient surroundings. This relative exposure of the guide rail and the newel pin bearings can add to the noisiness of the transporter. The use of the plastic strips on the guide rail to contact the handrail, and the replacement of the pin bearings with the plastic strip will produce a smooth low friction interface between the handrail and guide rail which will minimize noise and guide rail vibration, but will not eliminate the vibration. Thus with the prior art systems described above, some vibration will be induced into the guide rail by the handrail sliding over it, and that vibration will be passed along to the glass balustrade. The glass balustrade, due to the resiliency and flexibility of glass, when caused to vibrate, can act as a loudspeaker and actually magnify and convert the handrail vibration into noise.

DISCLOSURE OF THE INVENTION

This invention relates to a handrail mounting assembly for securing a handrail guide rail to a glass balustrade, which assembly reduces the transmission of handrail and guide rail vibrations to the balustrade, and therefore results in quieter operation of the transporter. The mounting assembly is generally similar to the prior art assemblies described above, with the exception that it includes a gasket between the guide rail and the balustrade that is formed from a material which absorbs vibrations from the guide rail, and prevents those vibrations from being transmitted to the glass balustrade. Any material having a high vibration isolation capability can be used, and the preferred gasket material is a closed cell PVC nitrile copolymer foam. The gasket is preferably about one-eighth inch thick and prevents any contact between the guide rail components and the glass balustrade.

It is therefore an object of this invention to provide an improved escalator or moving walkway of the type having a moving handrail mounted on a glass balustrade.

It is a further object of this invention to provide an escalator or walkway of the character described wherein vibrations originating in the handrail portion are prevented from inducing substantial vibrations in the balustrade.

It is an additional object of this invention to provide an escalator or walkway of the character described which is quieter due to the lessening of balustrade vibrations.

BRIEF DESCRIPTION OF THE DRAWING

These and other objects and advantages of the invention will become more readily apparent from the following detailed description of a preferred embodiment thereof when taken in conjunction with the accompanying drawing which is a fragmented cross-sectional view of a handrail and balustrade assembly formed in accordance with this invention.

BEST MODE FOR CARRYING OUT THE INVENTION

The handrail guide rail assembly, denoted generally by the numeral 2 is mounted on the edge of the glass balustrade 4. The rail assembly 2 includes an extruded metal core part 6 which has a basal slot 8 in which is seated a spring clip 10. The vibration-isolating foam gasket 12 is positioned on the balustrade 4 and is gripped by the spring clip 10. The gasket 12 is sized so as to completely isolate the balustrade 4 from direct contact with any of the remainder of the rail assembly 2. The core part 6 has lateral wings 14 and a pair of grooves 16 formed in its top surface. Strips 18 of low coefficient of friction plastic such as ultra high molecular weight polyethylene are snap-fitted onto the core part 6 and provide tracks along which the handrail 20 slides. The strips 18 help to lower handrail and guide rail vibration, and the gasket 12 isolates major amounts of such vibrations that do occur. In a typical installation using the gasket, the noise level at the newels will be reduced by about 6db as compared to the noise level when the gasket is not used.

It will be readily appreciated that the guide rail assembly of this invention is of simple construction, contains a relatively small number of component parts, and can be readily attached to an escalator balustrade without the need of any highly specialized tools. The assembly results in smooth quiet handrail operation and greatly reduces balustrade vibration otherwise created by the handrail.

Since many changes and variations of the disclosed embodiment of the invention may be made without departing from the inventive concept, it is not intended to limit the invention otherwise than as required by the appended claims.

What is claimed is:

1. In combination with an escalator or moving walkway having a glass balustrade, a guide rail assembly for guiding movement of a moving handrail, said guide rail assembly comprising:

a) a generally T-shaped guide rail metal core part, said core part having laterally projecting wings over which sides of the handrail telescope, and a bottom slot for receiving the upper edge of said glass balustrade;

b) means for securely holding said core part on said balustrade; and c) a gasket mounted on said upper edge of said glass balustrade, said gasket being formed from a closed cell resin foam material, and said gasket being operable to isolate said glass balustrade from vibrations of said handrail and guide rail core part to reduce vibrationally induced noise emanations caused by vibrations of said glass balustrade.

2. The combination of claim 1 wherein said gasket is formed from a closed cell PVC nitrile copolymer foam.

3. The combination of claim 2 further comprising low coefficient of friction plastic strips disposed on said core part wings for providing smooth low-friction tracks over which said handrail slides.

* * * * *